Nov. 13, 1962  A. G. HUPP  3,063,608
PLASTIC GLASS BREAKER DEPOSITOR
Filed Sept. 19, 1958  2 Sheets-Sheet 1
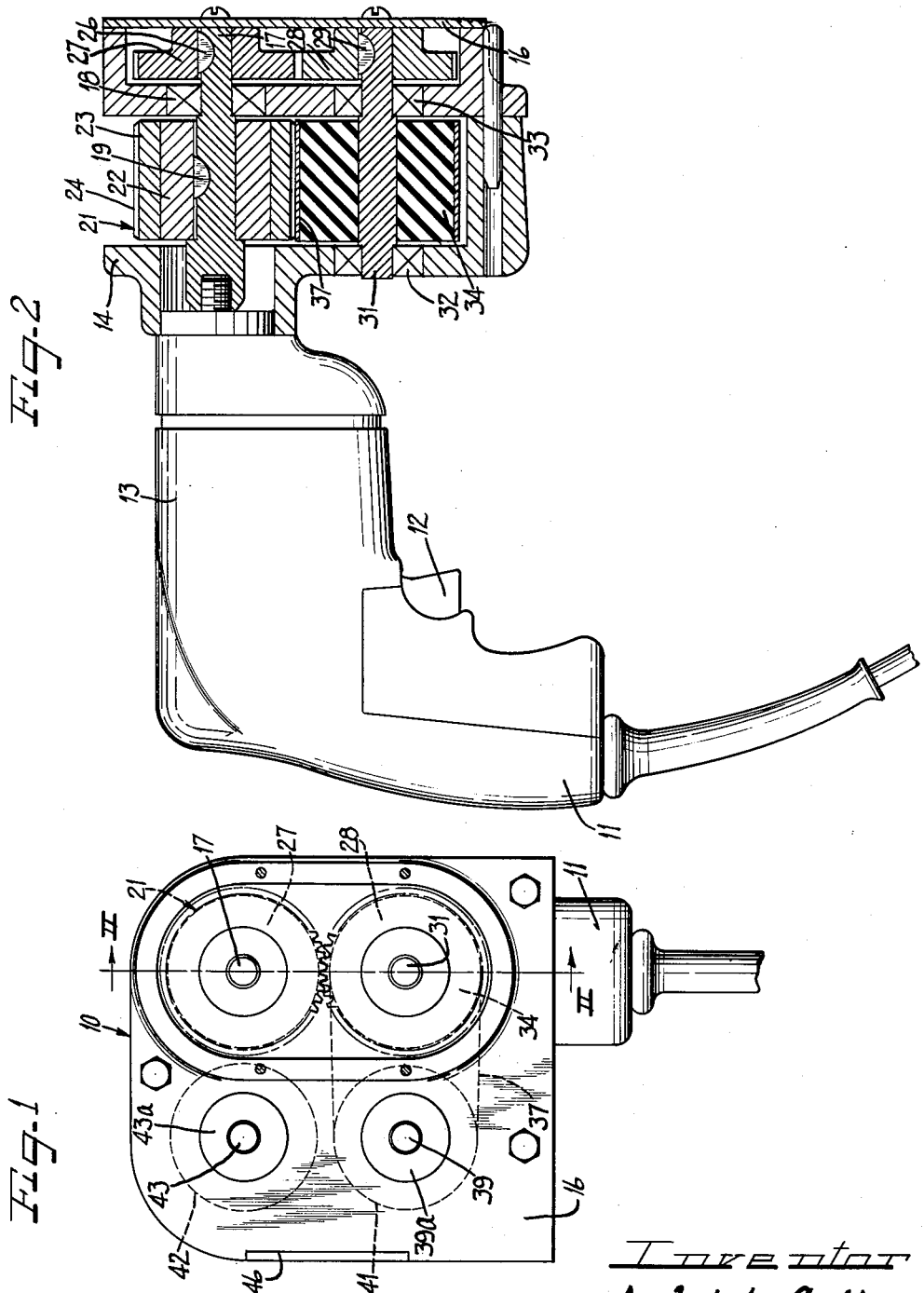
Inventor
Arleigh G. Hupp
By Hill, Sherman, Meroni, Gross & Simpson Attys Nov. 13, 1962 A. G. HUPP 3,063,608
PLASTIC GLASS BREAKER DEPOSITOR
Filed Sept. 19, 1958 2 Sheets-Sheet 2

Inventor
Arleigh G. Hupp
by Hill, Sherman, Meroni, Gross & Simpson Attys

United States Patent Office 3,063,608
Patented Nov. 13, 1962

3,063,608
PLASTIC GLASS BREAKER DEPOSITOR
Arleigh G. Hupp, % Hupp Engineering Associates,
P.O. Box 3290, N. Highway 301, Sarasota, Fla.
Filed Sept. 19, 1958, Ser. No. 762,051
5 Claims. (Cl. 225—97)

The present invention is concerned with a method for providing a continuous stream of cut glass strands of predetermined lengths. The invention is also concerned with an improved apparatus for carrying out this method.

The method and apparatus of the invention have particular applicability to the manufacture of resinous materials reinforced with discrete glass fiber strands. Such products are becoming more important commercially in view of their excellent strength characteristics and the ease in which the material can be molded or otherwise formed by conventional resin shaping processes.

The method and apparatus of the present invention lend themselves particularly well to shaping processes involving spraying a liquid resin onto the surface of a mold, followed by the application of the cut glass fiber strands and then followed by the reapplication of additional amounts of resin. For example, the initial resin coating may be applied by two spray guns, one spraying a liquid resin containing a promoter, and the other containing a liquid resin containing a catalyst. While the resin coating is still wet, the cut glass fibers are applied, preferably with the improved portable glass breaker of the present invention. Next, the additional amounts of resin are put on by the spray heads and the entire assembly may be rolled to compact or densify the applied coating. Finally, the coating is set into rigid form by the evaporation of solvents, heat, pressure, or other means normally employed to harden the resin involved.

Some difficulty has been experienced in securing a uniform stream of glass fibers for application in the manner described previously. Machines which have heretofore been employed for the purpose are frequently cumbersome and therefore difficult to maneuver into proper position for the application of the fibers. Furthermore, in most instances, it was impossible to start and stop the glass breaking mechanism at will since the glass strands had to be threaded through the machine anew every time the cutting mechanism was stopped.

With the foregoing in mind, an object of the present invention is to provide an improved apparatus for delivering a continuous stream of cut glass fibers.

Another object of the invention is to provide an apparatus which continuously delivers a stream of broken glass fibers of desired length and can be turned on and off at will.

Still another object of the invention is to provide a completely portable, hand held glass breaking apparatus embodying the features previously described.

A further object of the invention is to provide a method for more efficiently breaking glass fibers into desired lengths.

Yet another important object of the present invention relates to the provision of means on the rolls for positively preventing glass strand and the like from becoming entangled on the rolls.

An important feature of the present invention concerns the training of an endless belt providing a substantially large working surface area, comprised of a readily deformable material such as rubber, over the roll opposite the roll having the blades and over one of the feed rolls whereby the glass roving may be impressed against the belt to break the glass roving.

Still another object of the present invention relates to a new and improved glass breaker apparatus which may be more economically manufactured and which apparatus has a longer useful life without requiring the cleaning or replacing of the components of the apparatus.

Other objects and features of the present invention will be apparent to those skilled in the art from the following description of the attached sheets of drawings which illustrate a preferred embodiment of a glass breaking assembly.

In the drawings:

FIGURE 1 is a front view in elevation of the glass breaking assembly;

FIGURE 2 is a cross-sectional view taken substantially along line II—II of FIGURE 1;

As shown in the drawings:

Figure 3:
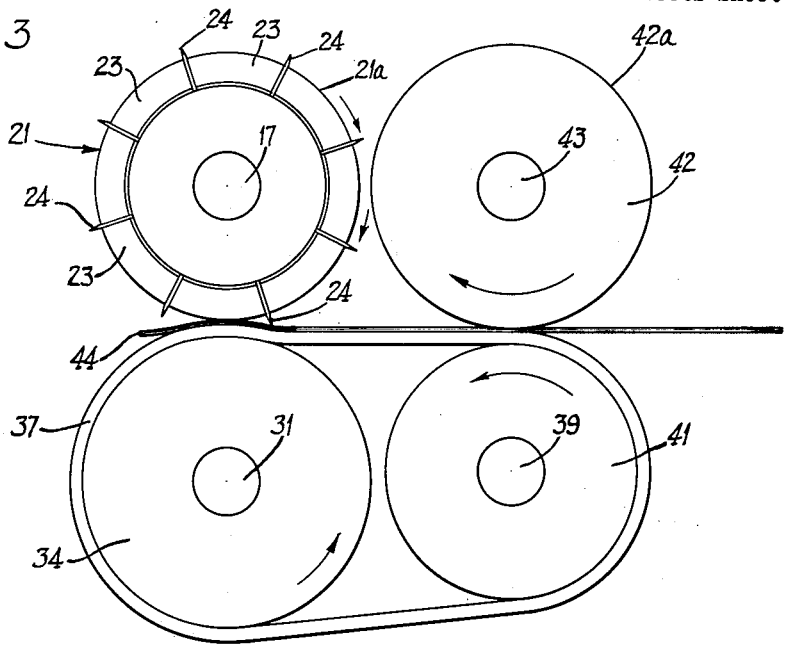
FIGURE 3 is a somewhat schematic view illustrating the condition of the glass strands just prior to a given breaking operation.

In FIGURE 1, reference numeral 10 indicates generally a portable glass breaker assembly including a handle portion 11 equipped with a trigger switch 12 for energizing a motor (not shown) contained within a conventional power tool motor housing 13.

The glass breaker assembly itself is detachably secured to the housing 13 and may consist of a frame 14 to which is secured a front facing plate 16 to provide a casing for the rotary elements in the glass breaking assembly.

A drive shaft 17 extending from motor assembly is mounted for rotation within the casing by a bearing 18. Secured to the drive shaft 17, as by means of a key 19, is a breaker roll assembly generally designated at numeral 21 in the drawings and consisting of a hub 22, a plurality of arcuate segments 23 detachably secured to the hub, 22 and a plurality of radially extending breaker blades 24 positioned between the segments 23 in peripherally spaced relation about the breaker roll assembly. The peripheral spacing of the blades 24, determines the length to which the glass fibers will be broken. In the particular embodiment shown in the drawing, eight such blades are positioned about the periphery of the breaker roll 21 in equally spaced relation, but it will be recognized that the number of blades and their position can be varied at will depending upon the requirements.

Also secured to the shaft 17 as by means of a key 26 is a gear 27 which meshes with a gear 28 secured by means of a key 29 to a shaft 31. A pair of bearings 32 and 33 mount the shaft 31 for rotation in the casing.

The shaft 31 also supports a resiliently deformable anvil roll 34 which provides a resilient backing for the breaking edges of the blades 24. While many different types of materials can be employed for the roll 34, I prefer to use a synthetic rubber material such as "neoprene" having a durometer reading of about thirty-five.

Figure 4:
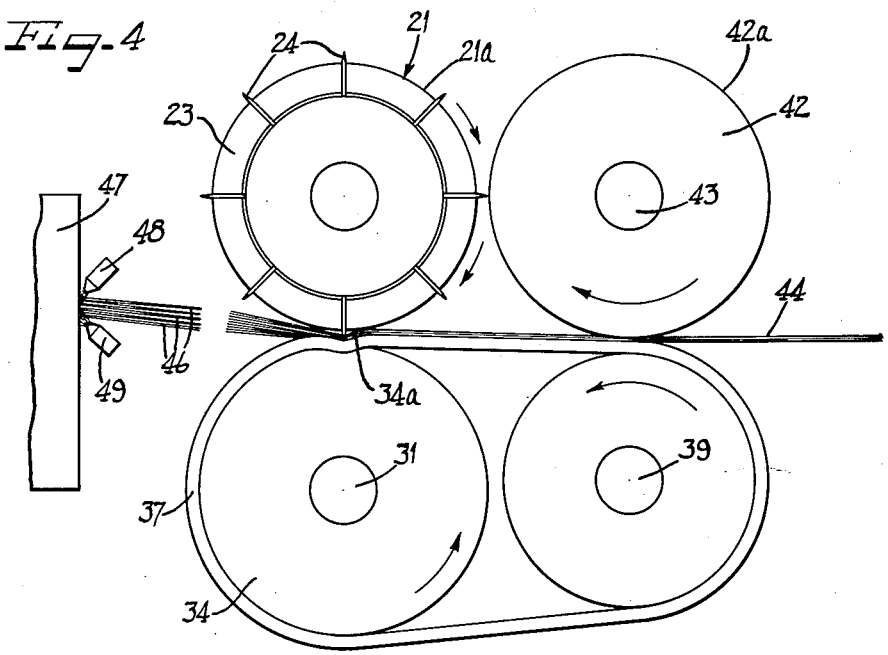
FIGURE 4 is a view similar to FIGURE 3 but illustrating the condition of the strands at about the time of the breaking operation, and also illustrating the manner in which the broken strands are applied to a surface.

Mounted on the roll 34 is a resilient area or belt 37 which is preferably comprised of a deformable material such as rubber. Mounted on a shaft 39 is a feed roller 41. The shaft 39 may be provided with a suitable bearing 39a, as is shown in FIGURE 1. The belt 37 is also engaged with the feed roller 41 thereby driving the feed roller in a counterclockwise direction as is shown in FIGURES 3 and 4 by the arrows. An idler roller 42 is mounted on a shaft 43 supported by suitable bearings 43a (FIGURE 1) which idler roller 42 and feed roller 41 cooperate together for feeding the glass strands along the belt 37 into the breaking area.

As the starting material, I prefer to use a glass fiber roving consisting of continuous filaments of glass loosely held together in a rope-like structure.

The roving 44 enters the glass breaker assembly through an inlet 46 whereupon it passes into the nip between the driven feed roll 41 and the superimposed idler roll 42 and travels towards the breaking area on the belt 37.

As the roving 44 is fed between the breaker roll 21 and the resiliently deformable roll 34, it is engaged by a blade 24 which serves to tension the roving against the belt 37 for the succeeding breaking operation.

The breaker roll 21, the resiliently deformable roll 34 and the feed roll 41 are driven at the same angular velocity. However, the effective diameter of the breaker roll 21, measured from the outer ends of two diametrically opposed blades 24, is slightly smaller than the normal effective or relaxed diameter of the resiliently deformable roll 34. Furthermore, the roll 34 is positioned sufficiently close to the path of the blades 24 so that during rotation of the breaker roll 21 the blades 24 are partly embedded in the resiliently deformable surface of the belt 37.

In the condition of the assembly shown in FIGURE 3, a blade 24 is beginning to press a roving 44 into the surface of the belt 37. The strands in the glass roving are therefore under tension from this time on until they are broken by the sharp angular pressure applied by the blades 24. The severance which occurs is not a simple shear across the strand but is primarily due to the flexing of the strand into and out of engagement with the deformable periphery of the belt 37 and the roll 34 providing the roll 34 is comprised of a deformable material.

From FIGURE 4 it will be noted that at the time the breaking action occurs, the surfaces of the roll 34 and the belt 37 are deformed or upset as indicated by the protuberance or upset belt and roll area 34a, whereupon pressure is applied to the portion of the roving immediately behind the breaking area and so the remainder of the strands are held in tension until the next succeeding blade 24 is in position to break an additional length of glass strands. With this arrangement, there is a continuous tensioning force being applied to the roving 44 before, during, and after the strands of the roving are broken into the desired discrete lengths. Accordingly, the glass breaking mechanism can be stopped at any time without the need for rethreading the strands through the roll assemblies.

To secure the proper tensioning, the diameter of the breaker roll, measured at the tips of the blades 24, is substantially the same as the diameter of the depressed surface periphery of roll 34, and, in turn, substantially the same as the diameters of the rolls 41 and 42. Thus when roll 34 is driven at the same speed as roll 41, the tips of the cutter blades 24 are running at the same lineal speed as the lineal speed at the periphery of rolls 41 and 42. However, the increase in diameter of the roll 34 occasioned by the protuberance 34a causes a tensioning of the glass roving from the rolls 41 and 42. Tensioning can also be provided by driving rolls 41 and 42 at a slightly lesser speed than the breaker roll and roll 34.

The manner of applying the broken strands is also illustrated somewhat schematically in FIGURE 4 of the drawings. The individual strands 46 broken by the glass breaker assembly are propelled toward an article such as a mold 47. The surface of the mold may be precoated for the reception of the strands by a pair of mobile spray guns 48 and 49 which direct a liquid promoted and catalyzed resin onto that surface. Then, after the strands 46 have become adhered to the coated surface, additional amounts of the resin may be applied over the strands. Finally, the strand-filled resin is set on the surface by the action of heat, pressure or other means for completing the setting reaction. It will be appreciated that if contaminating or parasitic materials such as resinous materials become deposited on the surface of the rolls 41 and 42 that the several filaments or strands of glass roving may momentarily adhere to the surface of either roll and immediately result in the entire strand being wound about either roll. This same result may occur on wet days or when the roving itself becomes contaminated with moisture static electric causing the strands to be wrapped on the rolls 41 and 42. Where the strands become wrapped about the rolls 41 and 42 it will be necessary to stop the spraying operation until the rolls may be cleaned which delays production and causes added labor to remove the wound strands and to clean the rolls. Means has been provided for eliminating the problems as is hereafter described.

According to still other features of this invention outer surface 21a of roll 21 is spaced from outer surface 42a of roll 42 a distance just slightly greater than the extent the blades 24 project radially outwardly of the outer surface 21a. This structural arrangement positively prevents strands of the roving 44 from wrapping around the roll 42 during its clockwise movement. The belt 37 also serves this same purpose with respect to the roll 41 by positively preventing strands of the roving 44 from being wrapped about the roll 41.

Another feature of the present invention relates to the provision of the rubber belt 37 trained about the rolls 34 and 41. In providing a rubber belt against which the breaker elements or blades impress the roving to effect cross-breaking of the glass filaments or strands, the working surface area is materially increased over that of the roll 34, and therefore the useful life of the belt is substantially greater. Further, it is considerably less expensive to replace the belt 37 than it is to replace the roll 34 where the roll 34 is of a molded construction.

While the foregoing description has been concerned essentially with glass strands, it should be recognized that the term "glass" as used herein should also apply to other types of filamentary materials having physical properties comparable to those possessed by glass strands.

It will be evident that various modifications can be made to the described embodiments without departing from the scope of the present invention.

I claim as my invention:

1. In a glass breaker assembly, a breaker roll, a plurality of peripherally spaced blades extending radially from said breaker roll to a given radius, an anvil roll mounted opposite the breaker roll and its blades, a guide roll mounted at one side of said anvil roll, and a resilient belt trained on said guide roll and said anvil roll providing means for conveying a glass strand from over the guide roll between the breaker roll and said anvil roll, said blades having tip ends of sufficient diameter providing means for upsetting said resilient belt creating an upset belt area to tension the glass strands between the upset belt area and the guide roll to successively bend portions of glass strands, said tip ends also providing means for bending and breaking the thus tensioned strands on the downstream side of the upset belt area causing the tensioned broken strands to fly apart in a stream from between said breaker roll and said anvil roll.

2. In a glass breaker assembly, a breaker roll, a plurality of peripherally spaced blades extending radially from said breaker roll to a given radius, a resilient anvil roll mounted opposite the breaker roll and its blades, a guide roll mounted at one side of said resilient anvil roll, and a resilient belt trained on said guide roll and said resilient anvil roll providing means for conveying a glass strand from over the guide roll between the breaker roll and said resilient anvil roll, said blades having tip ends of sufficient diameter providing means for upsetting said resilient belt, and said resilient anvil roll to tension the glass strands between an upset belt and roll area and the guide roll to successively bend portions of glass strands, said tip ends also providing means for bending and breaking the thus tensioned strands on the downstream side of the upset belt and roll area causing the tensioned broken strands to fly apart in a stream from between said breaker roll and said resilient anvil roll.

3. In a glass breaker assembly, a driven breaker roll, a plurality of peripherally spaced blades extending radially from said breaker roll to a given radius, a resilient anvil roll mounted opposite the breaker roll and its blades and means for driving said anvil roll at the same angular velocity as said breaker roll, a pair of guide rolls mounted at one side of said resilient anvil roll, and a resilient belt trained on one of said guide rolls and said anvil roll providing means for conveying a glass strand from between the guide rolls between the breaker roll and said resilient anvil roll, said blades having tip ends of sufficient diameter providing means for upsetting said resilient belt and said resilient anvil roll to tension the glass strands between an upset belt and roll area and the guide rolls to successively bend portions of glass strands, said tip ends also providing means for bending and breaking the thus tensioned strands on the downstream side of the upset belt and roll area causing the tensioned broken strands to fly apart in a stream from between said breaker roll and said resilient anvil roll.

4. A portable gun type glass breaker assembly comprising a gun type handle having a trigger, the handle being mounted on a motor housing having a motor therein operable by the trigger, a glass breaker frame mounted on the motor housing, a set of rolls mounted in spaced relation on said glass breaker frame in driving engagement with the motor including a breaker roll and an anvil roll, the breaker roll having a plurality of peripherally spaced blades extending to a given radius radially therefrom, a spaced set of rollers mounted in spaced relation to said rolls including an idler roller and a feed roller for receiving glass strands therebetween and being cooperable with the rolls for tensioning the glass strands, a resilient belt trained on said anvil roll and on said feed roller, said blades having tip ends of sufficient diameter providing means for upsetting said resilient belt creating an upset belt area to tension the glass strands between the upset belt area and the guide roll to successively bend portions of glass strands, said tip ends also providing means for bending and breaking the thus tensioned strands on the downstream side of the upset belt area causing the tensioned broken strands to fly apart in a stream from between said breaker roll and said anvil roll.

5. A portable gun type glass breaker assembly comprising a gun type handle having a trigger, the handle being mounted on a motor housing having a motor therein including a drive shaft operable by the trigger, a glass breaker frame mounted on the motor housing, a set of rolls mounted in spaced relation on said glass breaker frame including a breaker roll and an anvil roll, the breaker roll being mounted on said drive shaft, gearage joining said drive shaft with said anvil roll to drive said anvil roll, the breaker roll having a plurality of peripherally spaced blades extending to a given radius radially therefrom, a spaced set of rollers mounted in spaced relation to said rolls including an idler roller and a feed roller for receiving glass strands therebetween and being cooperable with the rolls for tensioning the glass strands, a resilient belt trained on said anvil roll and on said feed roller, said blades having tip ends of sufficient diameter providing means for upsetting said resilient belt creating an upset belt area to tension the glass strands between the upset belt area and the guide roll to successively bend portions of glass strands, said tip ends also providing means for bending and breaking the thus tensioned strands on the downstream side of the upset belt area causing the tensioned broken strands to fly apart in a stream from between said breaker roll and said anvil roll.

References Cited in the file of this patent

UNITED STATES PATENTS

| | | |
|---|---|---|
| 1,909,235 | Stuhlmann | May 16, 1933 |
| 2,157,067 | Brown et al. | May 2, 1939 |
| 2,262,988 | Brown et al. | Nov. 18, 1941 |
| 2,429,944 | Rayburn et al. | Oct. 28, 1947 |
| 2,478,020 | Stiles | Aug. 2, 1949 |
| 2,508,017 | Echter et al. | May 16, 1950 |
| 2,612,001 | Denlinger | Sept. 30, 1952 |
| 2,653,355 | Essman | Sept. 29, 1953 |
| 2,702,261 | Bacon et al. | Feb. 15, 1955 |
| 2,719,336 | Stotler | Oct 4, 1955 |
| 2,729,028 | Slayter et al | Jan 3, 1956 |
| 2,839,871 | Austin | June 24, 1958 |

FOREIGN PATENTS

| | | |
|---|---|---|
| 203,891 | Australia | Oct. 25, 1956 |